United States Patent

Zhao et al.

[11] Patent Number: 5,981,650
[45] Date of Patent: Nov. 9, 1999

[54] COLD SEAL ADHESIVES, COLD SEALABLE FILMS AND PACKAGES FORMED THEREWITH

[75] Inventors: Chen Zhao; Xiaoqing Li, both of Columbus, Ohio

[73] Assignee: Ashland Inc., Dublin, Ohio

[21] Appl. No.: 08/934,015

[22] Filed: Aug. 26, 1997

[51] Int. Cl.$^6$ .............................. C08J 3/00; C08K 3/20; C08L 75/00; C08L 83/00
[52] U.S. Cl. .................. 524/591; 428/423.1; 524/492; 524/493; 524/839; 524/840; 524/858
[58] Field of Search .................. 428/423.1; 524/591, 524/839, 840, 492, 493, 858

[56] References Cited

U.S. PATENT DOCUMENTS

| | | | |
|---|---|---|---|
| 5,396,749 | 3/1995 | Fukushima | 57/744 |
| 5,616,400 | 4/1997 | Zhang | 428/195 |
| 5,626,950 | 5/1997 | Shimano et al. | 442/76 |

*Primary Examiner*—Patrick D. Niland
*Attorney, Agent, or Firm*—Martin Connaughton

[57] ABSTRACT

Cold-seal adhesives are disclosed that contain no natural rubber and are capable of forming dry coatings on flexible films which adhere to one another with commercially acceptable packaging strength at room temperature by pressure contact, but also allow such layered substrata to be reeled into rolls and stored for extended periods of time without blocking. The flexible films are usable in forming packages, particularly for comestibles and pharmaceuticals, without need for heat sealing. Such cold-seal adhesives are aqueous dispersions containing 30 to 55 percent of a polyurethane ionomer reaction product, having a $T_g$ of between about –50 to 10° C., of a mixture of (a) a blend of between 0 and 40 percent polyester polyol and between 60 and 100 percent polyether polyol, (b) aliphatic diisocyanate and (c) dimethylol propionic acid and preferably containing 0.05 to 4 percent of grafted amorphous silica.

8 Claims, 1 Drawing Sheet

COLD SEAL ADHESIVES, COLD SEALABLE FILMS AND PACKAGES FORMED THEREWITH

BACKGROUND OF THE INVENTION

1. Field of the Invention

This application relates broadly to cold-seal adhesives, cold-sealable films, methods of forming packages therewith and packages sealed with the new cold-seal adhesives. More particularly, it concerns (a) polyurethane containing aqueous dispersion adhesives capable of forming dry, non-blocking adhesive layers on plastic film or equivalent webs that can then later be pressure bonded together without use of heat, (b) cold-sealable packaging films comprising such adhesive layers and (c) packages formed and sealed with such packaging films.

2. Description of the Prior Art

Cold-seal adhesives are an established class of commercial adhesives characterized by being coated onto plastic films or other substrata to form layers that have the capability of strongly bonding to themselves when pressure is applied, but lacking adhesion to low energy surfaces, e.g., plastic films, coated papers, etc., so such flexible webs bearing these cold-seal adhesives layers may be formed into rolls without blocking, i.e., without sticking together. The technical literature contains information about cold-seal adhesives which have become a recognized commercial commodity, e.g., see U.S. Pat. Nos. 4,810,745, 4,859,521, and 4,902,370.

Natural rubber remains a major component of choice for the production of cold-seal adhesives in spite of disadvantages associated with natural rubber latex, including age discoloration, unpleasant odor, undesirable foaming in wet form and possibility of anaphylactic shock due to presence of natural latex proteins. To overcome the problems associated with natural rubber, synthetic polymer dispersions have been used to replace it in cold-seal adhesive formulations as shown by U.S. Pat. Nos. 4,889,884 & 4,902,370. While limited success has been accomplished in mitigating the aforementioned problems, the fundamental balance of satisfactory cohesive bond strength vs antiblocking properties desired in cold-seal adhesives has proven hard to achieve on a commercial basis without use of natural rubber.

The present invention provides new forms of cold seal adhesives with remarkable balance of satisfactory cohesive bond strength vs antiblocking properties without use of natural rubber as an essential component.

Aqueous polyurethane dispersions are a known class of polymer systems as are various methods for their production and their use as coatings and adhesives, as shown by U.S. Pat. Nos. 4,540,633, 4,623,416, 4,851,459, 4,861,826 & 5,334,690.

The success of the present invention is due in part to the discovery that the inclusion of colloidal silica chemically grafted onto a functional polyurethane prepolymer in the new of cold-seal adhesives of the invention critically improves the non-blocking qualities. The inclusion of such —NCO grafted silica in the new cold-seal adhesive is to be contrasted to the use of colloidal silica per se, as well as hydrophilic and hydrophobic versions thereof, as additives in adhesive composition as shown by U.S. Pat. Nos. 3,993,847, 4,710,536, 4,749,590, 5,348,923 and 5,459,185.

The present invention builds on the prior knowledge discussed above to advance the art in production of cold-seal adhesives and their utilization in cold-sealable packaging films plus packages made therefrom and sealed without recourse to heat sealing. Essentially, it is an improvement of a related invention disclosed in U.S. Pat. No. 5,616,400, assigned to the assignee of this patent application.

OBJECTS

A principal object of the invention is the provision of new forms of polyurethane based, aqueous dispersions capable of forming cold-seal adhesive layers on substrata that possess a commercially acceptable balance of cohesiveness and antiblocking quality.

Further objects include the provision of:

1. Unique methods for production of such polyurethane based, aqueous dispersions.

2. Cold-seal adhesives in the form of aqueous dispersions that are devoid of problems associated with known cold-seal adhesives based on natural rubber latex.

3. Such cold-seal adhesives which in the form of a dry layer exhibit excellent antiblocking properties toward low energy plastic films or like webs, but still are capable of forming a strong cohesive bond between themselves under commercially acceptable pressure application.

3. New forms of cold-sealable packaging films.

4. New forms of packages formed from packaging film without use a heat sealing and characterized by absence of anaphylactic proteins and other substances prohibited by governmental regulations on the packaging of comestibles and pharmaceuticals.

5. Unique adhesive aqueous dispersions that can be compounded with commercially available aqueous dispersions including acrylic polymer dispersions, vinyl polymer dispersions, synthetic elastomer dispersions, tackifiers, antiblocking agents, etc. to enhance specific properties or requirements.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a cold-seal adhesive composition in the form of an aqueous dispersion containing (a) 30 to 55 percent solids content of a polyurethane ionomer reaction product, possessing a $T_g$ of between about −50 to 10° C., of a mixture of (a) a blend of 0–40% polyester polyol, and 60–100% polyether polyol, (b) 15 to 25 percent aliphatic diisocyanate, (c) 3 to 6 percent base dimethylol propionic acid and (d) 0.05 to 4 percent amorphous colloidal silica, said weight percentages of b, c & d being based on the total weight of a, b, c and d in said mixture.

The invention further provides unique sheet material for packaging of comestibles and pharmaceuticals comprising a continuous flexible plastic film having a surface energy level above 36 dynes/cm bearing a geometric pattern coating of dry cold seal adhesive consisting essentially of a polyurethane ionomer as described above. The opposite surface of the film has a surface energy level below 32 dynes/cm.

Additionally, the invention provides packages of items, especially comestibles and pharmaceuticals, comprising an envelope of flexible plastic film as described above having overlapping coatings of the cold seal adhesive pressure sealed together.

Polyester polyols and polyether polyols used in accordance with the invention are commercially available materials. Advantageously, the blend of such polyols used in forming the essential polyurethane ionomer reaction product will contain between about 60–100% polyether polyol and 0–40% polyester polyol and especially 80–100% polyether polyol and 0–20% polyester polyol.

Preferred polyether polyols include polypropylene glycol and ethylene oxide end capped polypropylene glycol with an average molecular weight from 500 to 4000, especially 1000–3000.

Preferred polyester polyols include the condensation products of diethylene glycol or dipropylene glycol with adipic acid or adipic acid with an optional amount of phthalic acid (up to 30% based upon the total weight of the mixture), e.g., poly(diethylene glycol adipate). Their average molecular weights range from 500 to 6000, especially 500–2000.

Preferred diisocyantes include hydrogenate methylene dihpenyl diisocyante (HMDI), hexamethylene diisocyanate (HDI), and, especially, isophorene diisocyanate (IPDI).

Preferred neutralization bases include triethanolamine, triethylamine and potassium hydroxide. The mechanical strength of the dry cold-seal adhesive films (coatings) of the invention varies with the base used for neutralization with KOH yielding the strongest films.

The aqueous dispersions of polyurethane prepolymers formed as precursors to the adhesive polyurethane ionomer reaction products of the invention are chain extended with water or the combination of water and a multifunctional aliphatic amine chain extender with 2–4 primary and secondary nitrogen atoms and 2–20 carbon atoms. Such amine chain extenders include ethylene diamine, 1,4-butanediamine, isophorene diamine, triethylenetetraamine, and triethylene oxide diamine (Huntsman EDR 148). Preferably, the quantity of the chain extender reagent is between about 0 to 2% of the total quantity of components used to form the polyurethane ionomer.

Silica grafted to an —NCO containing organic moiety, when used in combination with the unique polyurethane ionomer reaction products used in forming adhesive compositions and articles of manufacture of the invention, has been discovered in accordance with the invention to critically improve the anti-blocking qualities of the adhesives and articles of manufacture.

An advantageous method for providing —NCO group containing grafted colloidal silica preferred for use in creating the new cold seal adhesives of the invention comprises reacting colloidal amorphous silica with an organic polymer containing a functional isocyanate group. Advantageously, the —NCO group containing grafted silicas can be created in situ by the addition of colloidal anhydrous silica to the adhesive composition during a stage of its production when it contains polyurethane prepolymer having reactive —NCO functional groups during a stage of production of the adhesive composition.

Silica particle size, however added, is advantageously in the range of 1.4 to 12.0 μm, and especially in the range 2.5 to 6.0 μm. As previously stated, an effective range for the added grafted silica is between 0.05 to 4.0 percent, especially between 0.1 to 2.0 percent, of the total weight of polyurethane ionomer reaction product of the invention present in the adhesive composition.

In preferred embodiments, the cold seal adhesive coating in the new packaging films is the dried residue from the gravure roll application to the film of an aqueous cold seal adhesive dispersion as described above. Advantageously, the pattern of the coating consists of stripes of the cold-seal adhesive, particularly stripes in the form of a plurality of separate rectangles spaced apart longitudinally along the film.

Important new products of the invention are non-blocking rolls of sheet material for packaging of comestibles and pharmaceuticals comprising a continuous flexible plastic film having a side with a surface energy level above 36 dynes/cm bearing a geometric pattern coating of dry cold seal adhesive as described above. The opposite side of such cold seal adhesive coated film advantageously has a surface energy level below 32 dynes/cm.

Typically, the new polymer systems of the invention, when used as adhesives, are applied, e.g, by use of a gravure cylinder, in controlled stripe patterns to a film, foil or other flexible substrate having a surface energy value above 36 dynes/cm to give a dry coating weight of about 1 to 4 lb., especially 2–3 lb., per 3000 square feet of substrate surface. Such adhesive coated substrata after thorough drying can be rolled up for storage and transportation without blocking. Eventually, such coated substrata can be sealed together by overlapping the stripe patterns of dry adhesive and applying pressure to give good contact with formation of cohesive bonding between the cold-seal adhesive stripes.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are indicated with plain lines associated with the numerals and wherein.

Figure 1:
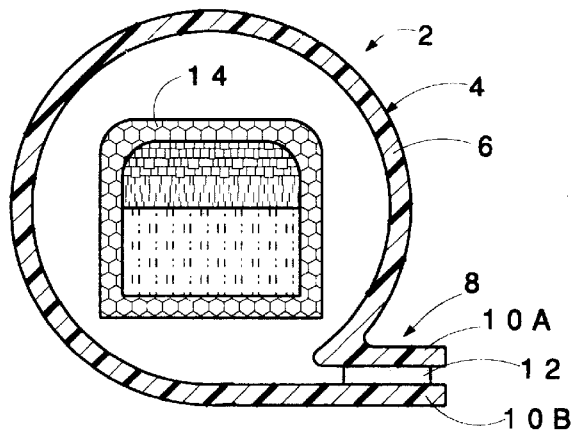
FIG. 1 is a sectional view of a package formed in accordance with the invention.
Figure 2:
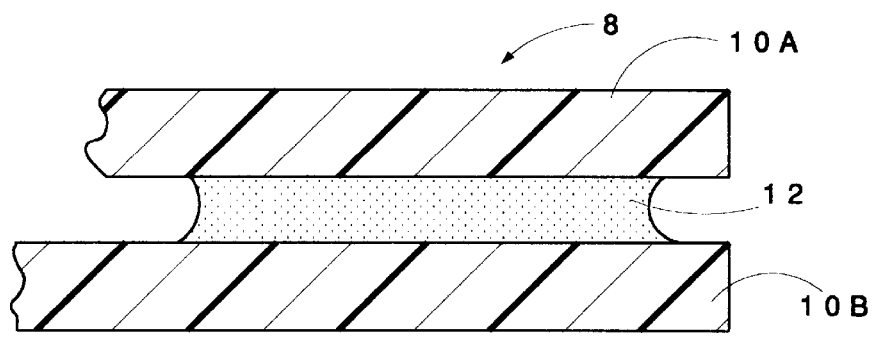
FIG. 2 is a fragmentary sectional view of a package seal formed using cold-sealable plastic packaging film of the invention.
Figure 3:
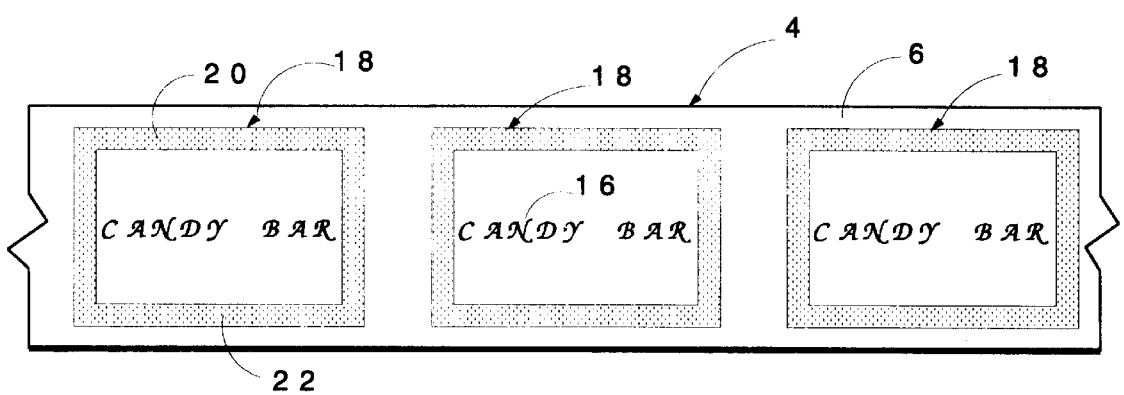
FIG. 3 is a fragmentary plan view of a cold-sealable plastic packaging film provided in accordance with the invention.

A package 2 of the invention comprises a wrapper 4 of plastic film 6 having longitudinal closure 8 which is formed of abutted film portions 10A and 10B sealed together by the adhesive layer 12 enclosing the comestible 14.

The creation of the final package 2 begins with a wrapping material 4 comprising plastic film 6 having applied thereto artwork 16 and a layer of cold seal adhesive 18 of the invention typically in a rectangular pattern defined by longitudinal stripes 20 and transverse stripes 22.

DESCRIPTION OF THE PREFERRED EMBODIMENTS

This invention is illustrated by the following examples of production of cold-seal adhesives and their utilization in accordance therewith. Such examples are for the purpose of illustration and are not intended to limit the scope of the invention. In these examples and throughout the remainder of this specification and the appended claims, all parts are by weight and all percentages are by weight of the total weight of all combined components unless otherwise indicated.

EXAMPLE 1

To a heat-jacketed reactor equipped with agitator, temperature controller and nitrogen in/outlet, 400 parts of poly (propylene oxide) (Witco ED3010, hydroxyl no. 37.5), 5 parts poly(ethylene glyco adipate) (Ruco S-1011-210, hydroxyl no. 210), 115 parts of isophorene diisocyanate (IPDI, Huls America) and 0.1 part of dibutyltin dilaurate are charged under nitrogen purge. The reaction mixture is heated to 70° C. and stirred for one hour, followed by the addition of 32 parts of dimethylol propionic acid, 2 parts of amorphous silica and 0:1 part of dibutyltin dilaurate. The reaction is then continued at 85° C. for another 4 hours to reach a —NCO content of 1.6%. At such point, heating is stopped and 18.5 parts of triethylamine and 650 parts of water are added to the reactor with stirring over a period of one-half hour forming an aqueous dispersion of polyurethane ionomer possessing a Tg value of about –24° C. Final stirring for two hours yields a white aqueous dispersion containing about 45% solids with a pH of 7.0 and Zham No. 2 cup viscosity of 18 seconds.

EXAMPLE 2

To a heat-jacketed reactor equipped with agitator, temperature controller and nitrogen in/outlet, 850 parts of poly(propylene oxide) (Arco, PPG-4025, hydroxy no. 28), 155 parts of hexanediol adipate (Witco Fomrez 66–56), 250 parts of isophorene diisocyante and 0.1 part of dibutyltin dilaurate are charged under nitrogen purge. The reaction mixture is heated to 85° C. and stirred for one hour, followed by the addition of 85 parts of dimethylol propionic acid, 13 parts of amorphous silica and 0.1 part of dibutyltin dilaurate. The reaction mixture is then continued at 85° C. for another 4 hours to reach a —NCO content of about 1.7%. At such point, heating is stopped and 60 parts of triethylamine and 1750 parts of water are added to the reactor with stirring over a period of one-half hour forming an aqueous dispersion of the polyurethane ionomer possessing a Tg value of about –24° C. Final stirring for two hours yields an aqueous dispersion containing about 42% solids with a pH of 7.5 and a Zahn No. 2 cup viscosity of 25 seconds.

EXAMPLE 3

To a heat-jacketed reactor equipped with agitator, temperature controller and nitrogen in/outlet, 850 parts of poly(propylene oxide) (Arco, PPG-4025, hydroxy no. 28), 155 parts of hexanediol adipate (Witco Fomrez 66–56), 250 parts of isophorene diisocyante and 0.1 part of dibutyltin dilaurate are charged under nitrogen purge. The reaction mixture is heated to 85° C. and stirred for one hour, followed by the addition of 85 parts of dimethylol propionic acid and 0.1 part of dibutyltin dilaurate. The reaction mixture is then continued at 85° C. for another 4 hours to reach a —NCO content of about 1.4%. At such point, heating is stopped and 60 parts of triethylamine and 1750 parts of water are added to the reactor with stirring over a period of one-half hour forming an aqueous dispersion of the polyurethane ionomer. Final stirring for two hours yields an aqueous dispersion containing about 42% solids with a pH of 7.0 and a Zahn No. 2 cup viscosity of 25 seconds.

EXAMPLE 4 (PRIOR ART)

The following procedure duplicates Example of U.S. Pat. No. 5,616,400, the content of which is incorporated herein by reference.

To a heat-jacketed reactor equipped with agitator, temperature controller and nitrogen in/outlet, 300 parts of poly(diethylene glycol adipate) (Ruco S-1011-55, hydroxyl no. 55), 69.4 parts of isophorene diisocyanate (IPDI, Huls) and 0.1 part of dibutyltin dilaurate are charged under nitrogen purge. This reaction mixture is heated to 85° C. and stirred for one hour, followed by the addition of 13.4 parts of dimethylol propionic acid and 0.1 part of dibutyltin dilaurate. The reaction is then continued at 85° C. for another 5 hours to reach a NCO content about 1.5%. At such point, heating is stopped and 10.1 parts of triethylamine amine is added to the reactor with stirring continued for 10 minutes to neutralize the viscous, anhydrous reaction product. Then, 600 parts of water is added to the reactor with vigorous stirring over a period of 30 minutes forming an aqueous dispersion of the polyurethane ionomer. Final stirring for two hours yields a bluish color, translucent aqueous dispersion containing about 40% solids with a pH of 7.5 and a Zahn No. 2 cup viscosity of 20 seconds.

EXAMPLE 5

Six different substrata are provided, namely:

A. Polypropylene film (Improved wrapper film A) with a nominal thickness of 150 guage is a lamination of (a1) metallized oriented polypropylene film manufactured by Toray Co. having a nominal thickness of 75 guage with energy level of 38 dynes/cm on a treated side and the other untreated side coated with a metal layer and (b1) oriented polypropylene film manufactured by Applied Extrusion Technology (AET) containing a moderate amount of slipping agent having a nominal thickness of 75 guage with energy level of 38 dynes/cm on a treated side and the other untreated side with energy level of 32 dynes/cm. The laminated film is made using lamination adhesive between the metal side of "a1" and the treated side of "b1" giving the laminated film an energy level of 38 dynes/cm on the "a1" side and an energy level of 32 dynes/cm on the "b1" side.

B. Polypropylene film (Improved wrapper film B) with a nominal thickness of 150 guage is a lamination of (a1) metallized oriented polypropylene film manufactured by Toray Co. having a nominal thickness of 75 guage with energy level of 38 dynes/cm on a treated side and the other untreated side coated with a metal layer and (b2) oriented polypropylene film manufactured by Borden Packaging and Industrial Products, containing a higher amount of slipping agent than the AET film, having a nominal thickness of 75 guage with energy level of 38 dynes/cm on a treated side and the other untreated side with energy level of 32 dynes/cm. The laminated film is made using lamination adhesive between the metal side of "a1" and the treated side of "b2" giving the laminated film an energy level of 38 dynes/cm on the "a1" side and an energy level of 32 dynes/cm on the "b2" side.

C. Polyester film (Improved wrapper film C) with a nominal thickness of 100 guage is an unlaminated polyester film with energy level of 38 dynes/cm on a treated side and a polyamide lacquered surface on the other side with energy level of 30 dynes/cm.

D. Polypropylene film (Toray PC-1 A) with a nominal thickness of 150 gauge in the form of a laminate of a first surface film of treated oriented polypropylene with energy level of 38 dynes/cm and a second surface film of untreated oriented polypropylene with energy level of 32 dynes/cm.

E. Polypropylene film (Toray PC-1 B) with a nominal thickness of 150 gauge in the form of a laminate of a first surface film of treated oriented polypropylene with energy level of 38 dynes/cm and a second surface film of untreated oriented polypropylene with a polyamide lacquered surface having an energy level of 30 dynes/cm.

F. Polypropylene film (Mobil 60-Mac) with a nominal thickness of 150 gauge in the form of a laminate of a first surface film of treated oriented polypropylene with energy level of 38 dynes/cm and a second surface film of untreated oriented polypropylene with energy level of 32 dynes/cm.

The dispersions of Examples 1–4 are coated on substrata A–E using a gravue coating cylinder to obtain a dry coat weight of 1.5–2.3 lb./ream. The resulting coated films are subjected to cold seal performance tests as initially produced resulting in the data reported in the following table I. After aging 30 days in storage at 25° C., the coated films are again tested resulting in the data reported in table II.

TABLE I

|  | Example 1 | | Example 2 | | Example 3 | | Example 4 | |
| --- | --- | --- | --- | --- | --- | --- | --- | --- |
| Substrate | BL | CS | BL | CS | BL | CS | BL | CS |
| A | 5 | 800 | 5 | 800 | 12 | 800 | 12 | 400 |
| B | 5 | 750 | 5 | 750 | 10 | 700 | 6 | <50 |
| C | 5 | 950 | 5 | 900 | 10 | 850 | 10 | 300 |
| D | 7 | 600 | 8 | 650 | 9 | 600 | 15 | 320 |
| E | 8 | 700 | 8 | 700 | 10 | 650 | 18 | 300 |
| F | 7 | 750 | 10 | 750 | 12 | 700 | 10 | 540 |

TABLE II

|  | Example 1 | | Example 2 | | Example 3 | | Example 4 | |
| --- | --- | --- | --- | --- | --- | --- | --- | --- |
| Substrate | BL | CS | BL | CS | BL | CS | BL | CS |
| A | 7 | 750 | 7 | 750 | 15 | 600 | 8 | <100 |
| B | 7 | 750 | 7 | 700 | 15 | 650 | 6 | <50 |
| C | 7 | 800 | 7 | 800 | 19 | 700 | 5 | <100 |
| D | 10 | 700 | 11 | 650 | 13 | 600 | 16 | 340 |
| E | 12 | 700 | 10 | 650 | 15 | 600 | 10 | 340 |
| F | 11 | 800 | 12 | 750 | 19 | 650 | 12 | 550 |

In Tables I & II, the columns headed BL list the data for blocking values and the columns headed CS list the data for cold seal values of the respective adhesives of Examples 1–4 and Substrates A–F.

The test data in Tables I & II show that the improved wrapper films represented by substrates A–C present critically more difficulty for cold seal adhesives to provide acceptable blocking values as shown by the fact that the prior art adhesive of Example 4 yielded unacceptable cold sealing data with substrates A–C. Further, even with substrates D–E, where acceptable coldsealing data are obtained with the prior art adhesive of Example 4, the improved cold seal adhesives of the invention, i.e., Examples 1–3, yield cold sealing values about double those of the prior art.

TEST METHODS

T-peel strength: Bond strength is measured according to ASTM D1876-72. Briefly, the dry cold seal adhesive coated plastic films are bonded together by application of 80 psi pressure with 0.5 second dwell time at ambient temperature. The T-peel bond is measured immediately on an Instron tensometer with 305 mm/minute speed. The T-peel strength is reported in grams/25 mm.

Blocking: This is measured as T-peel strength between the coated side and uncoated side of the portions of the substrate taken from a roll.

Cold seal bonding: This is measured as T-peel strength between the coated sides of two sections of coated substrate that have been pressed together under pressure of 80 psi for 0.5 seconds.

Coat weight: The dry adhesive coat weight on the substrate is measured according to ASTM D899-51. The coat weight is reported in lb./ream (lb./3000 ft2).

Viscosity: Viscosity of the aqueous dispersions of cold seal adhesive is measured according to ASTM D1084-63, Method A, Zahn cup No. 2. Viscosity is reported in seconds.

Solids content: Solids content of the aqueous dispersions is measured using an Arizona Instrument Model LX-10 solid analyzer. The starting temperature is 60° C. and the highest temperature is 200° C. The solids content is reported in weight percentage.

Glass transition temperature (Tg): The Tg of the dry adhesive is measured by Rheometrics Dynamics Analysis (RDA) method. Its value is obtained from the maximum of the tan δ curve.

Surface energy of substrate: This property is approximately measured by a dyne pen method. Different dyne level markers are obtained from Diversified Enterprises and are used to make the measurements. The surface energy is reported in dynes/cm.

We claim:

1. In a cold-seal adhesive composition in the form of an aqueous dispersion containing 30 to 55 percent of a polyurethane ionomer reaction product, possessing a $T_g$ of between about −50 to 10° C., of a polyester polyol and polyether polyol blend, alphatic diisocyanate and dimethylol propionic acid, the improvement which consists in having said adhesive composition contain between 0.05 to 4 percent of the quantity of said reaction product present in said adhesive composition of colloidal amorphous silica reacted in situ with an organic —NCO containing moiety present in said adhesive composition.

2. Sheet material for packaging of comestibles and pharmaceuticals comprising a continuous flexible plastic film having a first surface with energy level above 36 dynes/cm and a second surface with energy level at or below 32 dynes/cm with said first surface bearing a geometric pattern coating of dried cold seal adhesive composition of claim 1.

3. Sheet material for packaging of comestibles and pharmaceuticals comprising a continuous flexible plastic film having a first surface with energy level above 36 dynes/cm and a second surface with energy level at or below 32 dynes/cm with said first surface bearing a geometric pattern coating of dried cold-seal adhesive composition in the form of an aqueous dispersion containing 30 to 55 percent of a polyurethane ionomer reaction product, possessing a $T_g$ of between about −50 to 10° C., of a polyester polyol and polyether polyol blend, alphatic diisocyanate, dimethylol propionic acid, and between 0.05 to 4 percent of the quantity of said reaction product present in said adhesive composition of colloidal amorphous silica reacted in situ with an organic —NCO containing moiety present in said adhesive composition.

4. A non-blocking roll of sheet material for packaging of comestibles and pharmaceuticals comprising a continuous flexibles plastic film having a first surface with energy level above 36 dynes/cm and a second surface with energy level at or below 32 dynes/cm with said first surface bearing a geometric pattern coating of dried cold-seal adhesive composition in the form of an aqueous dispersion containing to 30 to 55 percent of a polyurethane ionomer reaction product, possessing a $T_g$ of between about −50 to 10° C., of a polyester polyol and polyether polyol blend, alphatic diisocyanate, dimethylol propionic acid, and between 0.05 to 4 percent of the quantity of said reaction product present in said adhesive composition of colloidal amorphous silica reacted in situ with an organic —NCO containing moiety present in said adhesive composition.

5. Sheet material for packaging of comestibles and pharmaceuticals comprising a continuous flexibles plastic film having a first surface with energy level above 36 dynes/cm and a second surface with energy level below 32 dynes/cm with said first surface bearing a geometric pattern coating of dry cold seal adhesive consisting essentially of a polyurethane ionomer reaction product, possessing a Tg of between about −50 to 10° C., of a mixture of (a) a blend of between 0 and 40 percent polyester polyol and between 60 and 100 percent polyether polyol, (b) alphatic diisocyanate, (c) dimethylol propionic acid and (d) between 0.05 to 4% of said polyurethane reaction product present in said adhesive composition of colloidal amorphous silica reacted in situ with an organic —NCO containing moiety present in said adhesive composition.

6. A non-blocking roll of sheet material for packaging of comestibles and pharmaceuticals comprising a continuous flexibles plastic film having a first surface with energy level about 36 dynes/cm and a second surface with energy level below 32 dynes/cm with said first surface bearing a geometric pattern coating of dry cold seal adhesive consisting essentially of a polyurethane ionomer reaction product, possessing a Tg of between about −50 to 10° C., of a mixture of (a) a blend of between 0 and 40 percent polyester polyol and between 60 and 100 percent polyether polyol, (b) alphatic diisocyanate, (c) dimethylol propionic acid and (d) between 0.05 to 4% of said polyurethane reaction product present in said adhesive composition of colloidal amorphous silica reacted in situ with an organic —NCO containing moiety present in said adhesive composition.

7. Sheet material for packaging comestibles claimed in claim 5, where the polyurethane ionomer reaction product is formed from a mixture of;

a) a blend of from 0 to 40% polyester polyol and from 60 to 100% polyether polyol, b) from 15 to 25% alphatic diisocyanate, c) from 3 to 6% dimethylol propionic acid, and d) from 0.05 to 4% amorphous colloidal silica;

where said percentages of b, c and d are based on the total weight of a, b, c and d in said mixture.

8. Non-blocking sheet material as claimed in claim 6, where the polyurethane ionomer reaction product is formed from a mixture of;

a) a blend of from 0 to 40% polyester polyol and from 60 to 100% polyether polyol, b) from 15 to 25% alphatic diisocyanate, c) from 3 to 6% dimethylol propionic acid, and d) from 0.05 to 4% amorphous colloidal silica;

where said percentages of b, c and d are based on the total weight of a, b, c and d in said mixture.

* * * * *